Nov. 3, 1936. R. G. WENZEL 2,059,763

FISHING REEL

Filed April 4, 1935

INVENTOR
RUDOLPH G. WENZEL

BY Albert L. Ely

ATTORNEY

Patented Nov. 3, 1936

2,059,763

UNITED STATES PATENT OFFICE 2,059,763

FISHING REEL

Rudolph G. Wenzel, San Francisco, Calif., assignor to The Enterprise Manufacturing Company, Akron, Ohio, a corporation of Ohio Application April 4, 1935, Serial No. 14,601

4 Claims. (Cl. 242—84.5)

The present invention relates to new and useful improvements in fishing reels, and while the invention possesses utility and novelty as applied to fishing reels of all types, it is particularly adapted and intended for use on fishing reels of the type known as "trout reels" and is shown as applied to that particular type of reel.

The object of the invention is to provide an adjustable drag device which is so constructed as to exert a certain resistance against the unwinding of the line and yet permit the spool to be rotated freely and without offering any resistance when reeling in the line. The invention has for its purpose to provide a simple and inexpensive combination of elements for the stated purpose, which can be mounted on a reel of the type referred to, without necessitating change in the design of the reel or extensive alterations from established and recognized constructions.

In the drawing the preferred or best known embodiment of the invention is shown, but it will be understood that the invention may be embodied in other forms or modified and improved, all within the scope of the invention.

The several views of the drawing are as follows.

Figure 1:
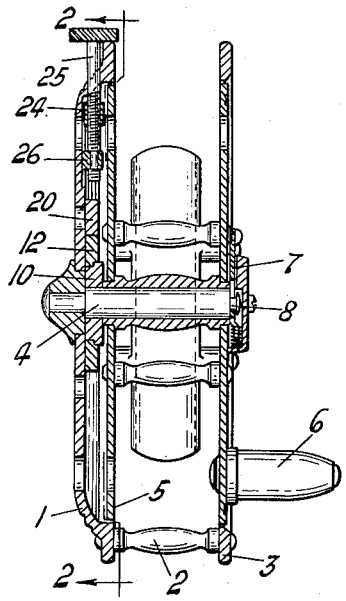
Figure 1 is a cross-section through a reel of the standard trout reel designed equipped with the invention, the section being taken on the line 1—1 of Figure 2.
Figure 2:
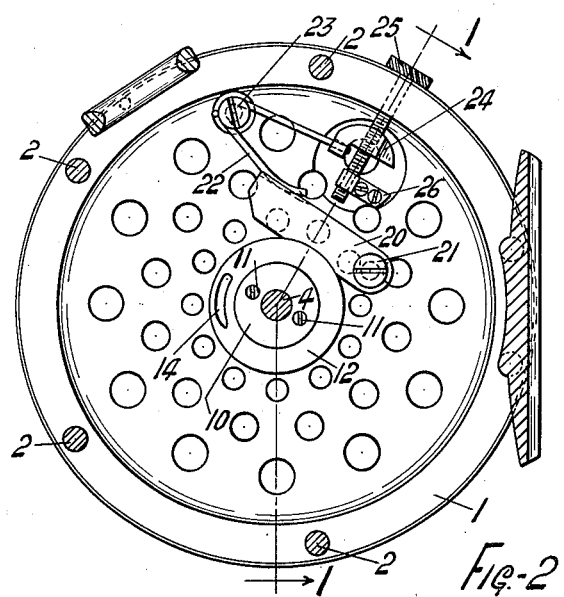
Figure 2 is a section on the line 2—2 of Figure 1 looking into the frame of the reel with the spool removed, showing the parts of the improved drag mechanism.

The reel comprises the usual frame comprising the back plate 1 which is connected by a series of pillars 2 to the ring 3. Rising from the center of the back plate is a post 4 upon which is rotatably mounted the spool 5, the outer surface of which is flush with the ring and provided with the usual handle or knob 6 by which the spool is rotated. The spool may be lifted off the post, being held in place by a latch 7 which engages with a groove 8 in the top of the post 4.

Figure 4:
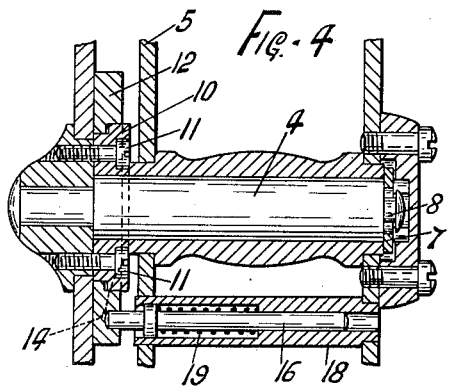
Figure 4 is an enlarged section on the line 4—4 of Figure 3.
Figure 3:
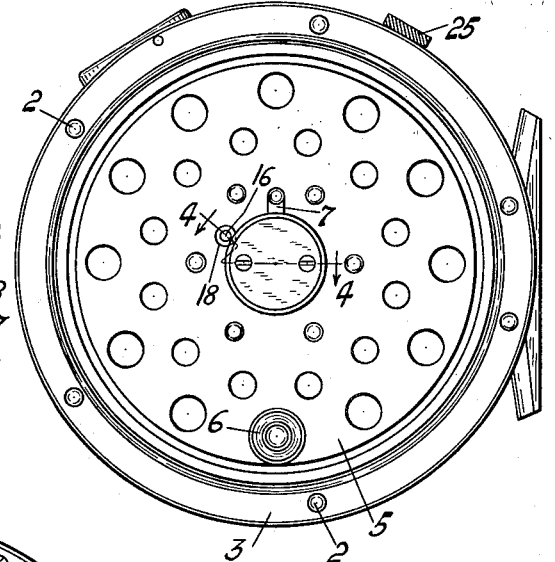
Figure 3 is a view of the reel with the spool in place.

On the base of the post adjacent the back plate is a bearing plate 10 which is secured to the back plate by screws 11. The plate 10 is formed with an overhanging flange so as to retain a rotatable ring 12 which is the friction ring of the drag mechanism. The upper surface, or that surface of the ring 12 which is adjacent the spool, is provided with a notch 14, one side of which slopes upwardly to the surface of the ring and the other side of which is abrupt so that this constitutes a ratchet recess in which may enter a spring pressed pin 16 which constitutes a pawl mounted in the body of the spool. The pin is shown in detail in Figure 4 and is mounted in a barrel 18 secured in the spool, being urged outwardly by the spring 19.

It will be observed that as the spool rotates in one direction, i. e., the winding direction, the pin will ride out of the notch 14 at each revolution so that the operation of the spool is free in that direction and no drag is exerted upon the spool. When, however, the spool is rotated in the reverse direction, i. e., in the direction it is turned when the line is being drawn out, the pin will contact with the abrupt end of the notch and the ring will be compelled to rotate with the spool.

This affords a simple means of securing the braking effect upon the spool as the line is withdrawn, as by the running of a fish. This result is secured by combining with the rotatable ring a brake mechanism acting upon the outer surface thereof and preferably always in contact therewith. Such a device is constituted by the pivoted brake shoe 20 mounted upon the pin 21 and having a curved surface bearing against the rim of the ring. A leaf spring 22 is shown mounted upon the pin 23 and having one end bearing upon the outer end of the brake shoe and its other end in an adjustable keeper 24. The keeper 24 is moved to adjust the pressure of the spring by means of a screw 25, the inner end of which is held by a bearing 26 fixed on the back plate, the outer end of the screw being located on the outer edge of the frame. The keeper and bearing may be set in a recess in the back plate.

Figure 5:
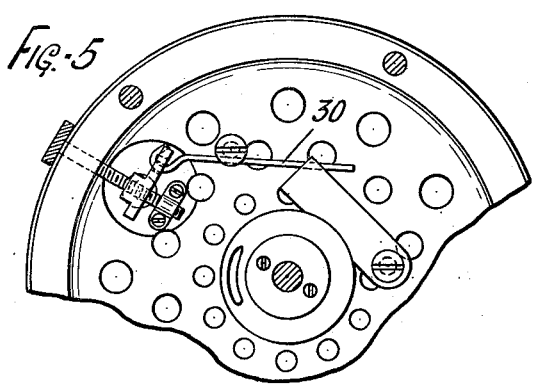
Figure 5 is a view of a modified type of spring construction.

In Figure 5 a straight spring 30 may be substituted for the spring 22, in which construction the reverse action of the screw 25 is employed for adjusting the tension of the spring.

The balance of the reel structure is old and well known and will not be described in detail, the combination which is new and useful consisting of the rotatable friction ring with means to couple it with the spool when rotated in one direction and the braking mechanism bearing against the ring. This combination secures the effect of retarding the spool as the line is being payed out, but permitting it to be reeled in freely.

It is possible that this idea may be embodied in other forms than that shown, and the invention is not necessarily limited to exact conformity with the detailed drawing and description. It will be apparent that the drag mechanism is set at all times and may be adjusted to vary the effect of the brake.

What is claimed is:

1. A fishing reel comprising a rotatable spool, a friction ring adjacent the spool, a ratchet-shape notch in a lateral surface of the ring, a pin on the spool engageable with the notch, and a brake bearing against the ring.

2. A fishing reel comprising a rotatable spool, a post upon which the spool is journaled, a rotatable ring spaced from the spool and concentric with the post, a ratchet notch in a lateral surface of the ring, a pawl on the spool engageable with the notch, and a braking device bearing against the ring at all times.

3. A fishing reel comprising a frame, a post therein, a spool rotatable upon the post, a bearing member surrounding the post and a ring revoluble about the bearing member, a brake engaged with the ring, the ring having a ratchet notch, and a pawl on the spool engageable therewith.

4. In a fishing reel, a frame, a post extending from the frame, a spool journalled upon the post and spaced from the frame, a ring revoluble around the post and lying between the spool and the frame, a brake restraining the rotation of the ring, and a pawl and ratchet located on the spool and the face of the ring.

RUDOLPH G. WENZEL.